United States Patent [19]
Martin

[11] Patent Number: 4,885,453
[45] Date of Patent: Dec. 5, 1989

[54] BRAKE FOR WELDING MACHINE
[75] Inventor: Donald L. Martin, Santa Ana, Calif.
[73] Assignee: M. K. Products, Irvine, Calif.
[21] Appl. No.: 231,179
[22] Filed: Aug. 11, 1988
[51] Int. Cl.⁴ .......................... B23K 9/00; B23K 9/28; B23K 9/10; B23K 9/12
[52] U.S. Cl. ................................ 219/136; 219/137.7; 219/137.31; 219/137.2; 242/75.4; 242/99
[58] Field of Search ............. 219/137.7, 137.31, 137.2, 219/136; 242/75.4, 99, 156; 188/71.2, 71.1, 82.7, 82.3, 68, 166, 167

[56] References Cited
U.S. PATENT DOCUMENTS

| | | | |
|---|---|---|---|
| 3,143,633 | 8/1964 | Wadleigh | 219/137.2 |
| 3,395,308 | 7/1968 | Meyer | 219/137.7 |
| 4,072,828 | 2/1978 | Thome | 219/137.31 |

Primary Examiner—Clifford C. Shaw
Assistant Examiner—Scott A. Rogers
Attorney, Agent, or Firm—Plante Strauss Vanderburgh & Connors

[57] ABSTRACT

Disclosed is a braking system for a spool of coiled wire used in a welding machine. The braking system includes a spindle mounted to the machine to rotate freely. The spindle has a braking surface and it has mounted to it an annular brake member having teeth around its circumference and a braking surface which engages the braking surface on the spindle. The two braking surfaces frictionally coupled the spindle and brake member together so they rotate as a unit. The braking surfaces slide relative to each other through a predetermined rotational distance when the rotation of the brake member is stopped abruptly. A solenoid actuated pawl engages one of the teeth of the brake member to stop this member, allowing the spindle to rotate through a limited rotational distance of, for example, a maximum of about twenty degrees of rotation.

12 Claims, 3 Drawing Sheets

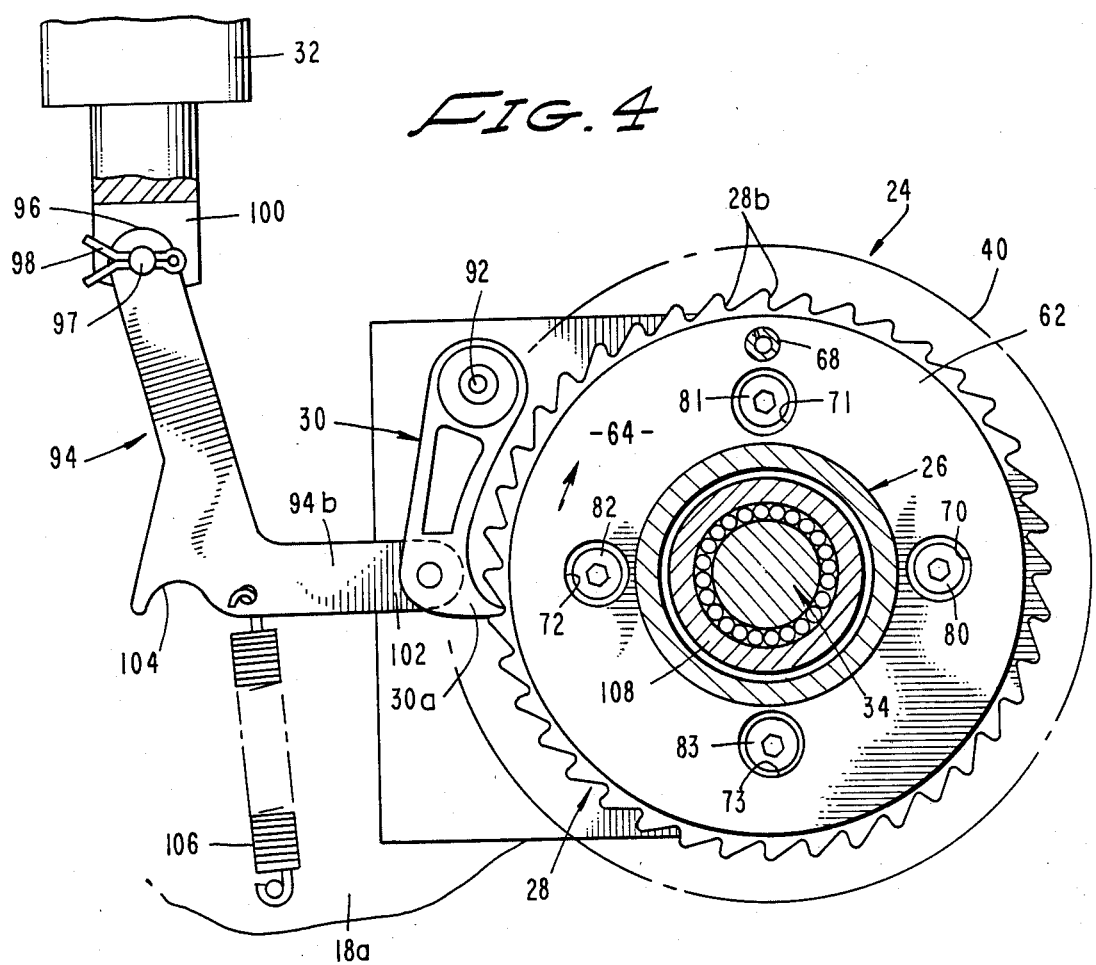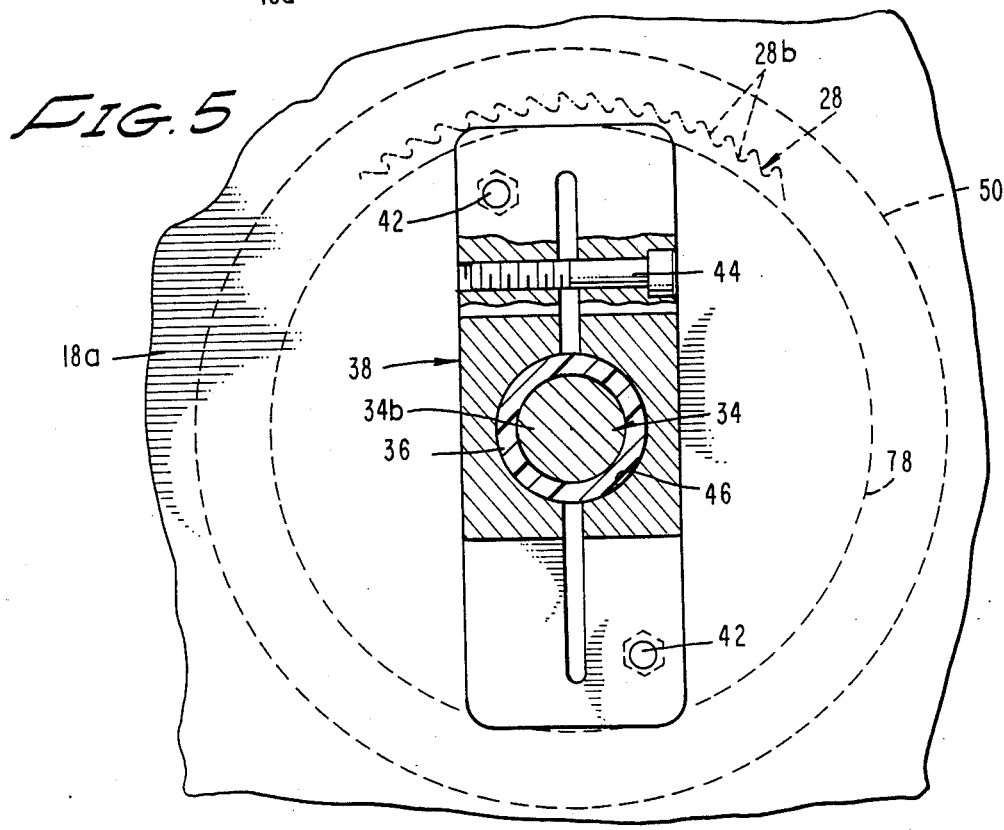

BRAKE FOR WELDING MACHINE

BACKGROUND OF THE INVENTION

1. Field of the Invention

This invention relates to a brake used to stop rotation of a spool of coiled wire, and particularly, to a braking system for welding machines which is economical to manufacture, provides excellent performance characteristics, and requires no factory or field adjustment over the useful life of the braking system.

2. Background Discussion

In certain welding processes, a filler material in the form of a coiled wire on a spool is fed to a welding gun. A typical welding machine which utilizes wire filler material coiled on a spool is illustrated in U. S. Pat. No. 3,562,577. In this welding machine, the wire filler material is fed by rollers carried in the welding gun to the welding site. When the welding stops, the wire feed stops essentially immediately. To prevent unspooling of the wire, it is necessary to stop the spool before it has rotated more than about twenty degrees. In existing welding machines, various brake mechanisms are employed. For example, passive friction drag mechanisms, external self-energizing drum brakes, and electromagnetic clutches are all used. These conventional brake mechanisms have various problems associated with them, such as presenting excessive loads on the wire feeder, excessive mechanical complication leading to expensive, difficult to manufacture equipment, and frequent adjustments in the field.

SUMMARY OF THE INVENTION

It is the objective of the present invention to provide a braking system for a spool of coiled wire which overcomes the problems associated with conventional brake mechanisms, is economical to manufacture, has excellent performance characteristics, and requires no factory or field adjustment over the life of the braking system.

There are several features of this invention which contribute to its desirable attributes, no single one of which is solely responsible for these attributes. Without limiting the scope of this invention as expressed by the claims, its more prominent features will now be discussed briefly. After considering this discussion, and particularly after reading the section of this application entitled DETAILED DESCRIPTION OF THE PREFERRED EMBODIMENT, one will understand how the features of this invention provide its desirable attributes.

One feature of this invention is the use of a unique type spindle mounted on the machine which carries the spool of coiled wire. The spindle has at one end a raised flange member which has a braking surface that coacts with a brake member carried on the spindle adjacent the flange member. The spindle may include drag means which create frictional drag on the spindle so that the coiled wire does not unspool.

The second feature of this invention is that the braking surface of the brake member and the braking surface of the flange member slip relative to each other when the brake member is stopped abruptly. When the brake member is stopped, the spindle carrying the wire spool will continue to rotate until stopped by the frictional forces between the two braking surfaces. This slippage allows the kinetic energy of the heavy wire spool to be dissipated in heat generated by the frictional forces acting between the braking surfaces. Preferably, the brake member is an annular ring having along its circumference a series of teeth which engage a pawl member that is under control of, for example, a solenoid.

The third feature of this invention is the use of self-adjusting means to maintain the frictional force between the braking surfaces within a predetermined range. This regulates the rotational distance which the spindle and brake member will slip relative to each other so that the distance does not exceed a predetermined limit. Generally, this distance does not exceed twenty degrees of rotation for most applications. Thus, the wire will not unspool. Three factors govern the rotational distance the braking surfaces will slip relative to each other. The first is the force between the braking surfaces. The second is the materials used for the braking surfaces. The third is the moment arm, that is, the diameter of the brake member. By taking these factors into consideration, the degree of rotation of the spindle after the brake member has been stopped can be limited so that it will not exceed twenty degrees of rotation with a fully loaded spool at the highest rotational speed. If the degree of rotation exceeds twenty degrees, the wire on the spool will become so loosened that it will clear the spool faces and become free of the spool.

BRIEF DESCRIPTION OF THE DRAWING

The preferred embodiment of this invention is illustrated in the drawing, which is for illustrative purposes only, and in which:

FIG. 4 is a cross-sectional view taken along line 4—4 of FIG. 3.

FIG. 5 is a cross-sectional view taken along line 5—5 of FIG. 3.

DESCRIPTION OF THE PREFERRED EMBODIMENT

Figure 1:
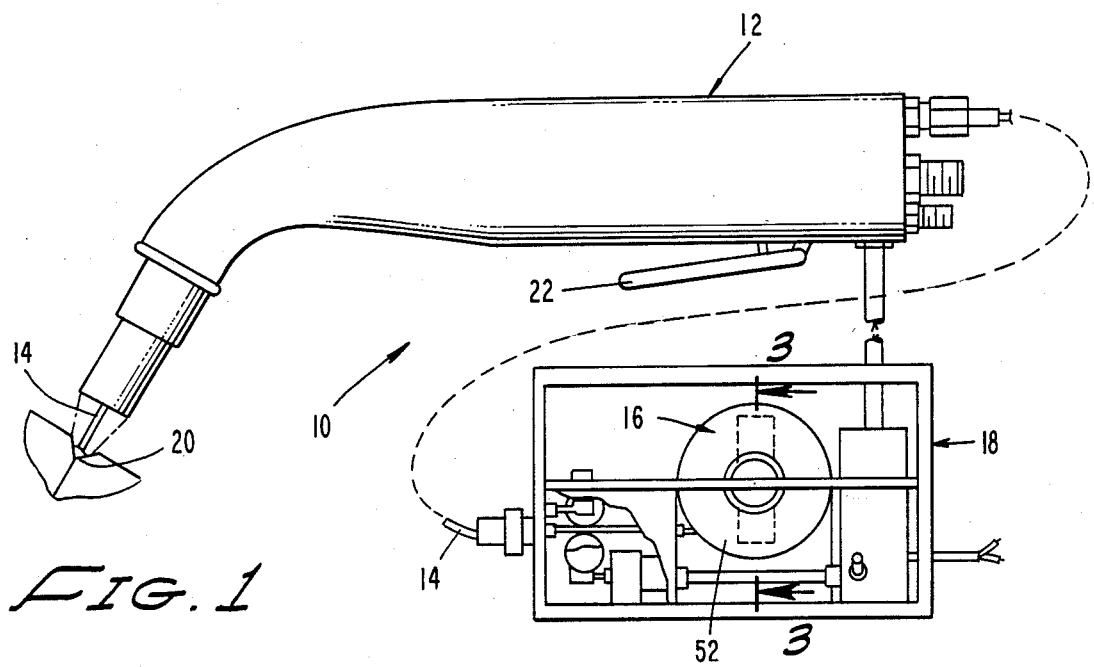
FIG. 1 is a schematic side elevational view illustrating a typical welding machine employing a spool of coiled wire filler material.

As shown in FIG. 1, a typical welding machine 10 employs a welding gun 12 which has motor driven wire feed rollers (not shown) for feeding coiled wire filler material 14 from a spool 16 located in a remote wire feeder unit 18. The feed rollers feed the wire filler material 14 to the weld site 20 in response to the operator pushing a control switch 22 on the welding gun 12. When the operator releases the switch 22, the feed rollers immediately stop feeding wire filler material 14 to the weld site 20. The wire filler material 14 carried by the spool 16 will continue to unspool due to the momentum of the spool which continues to rotate the spool.

The braking system 24 of this invention is employed to stop the rotation of the spool 16 within about twenty degrees of rotation of the fully loaded spool. Typically, the spool 16 is approximately twelve inches in diameter and four inches wide and holds twenty to forty-five pounds of wire. This wire is fed by the welding machine 10 at speeds up to one thousand inches per minute resulting in full spool rotation of thirty-two revolutions per minute, or one half revolution per second. The spool 16 is a hollow cylindrical member having a passageway 48 extending through its center and terminating in open ends 48a and 48b, a pair of face plates 50 and 52 at its opposite ends, and an elongated cylindrical receptacle 54 extending into the body 56 of the spool through the plate 50. The wire filler material 14 is coiled about the body 56 of the spool 16.

Figure 2:
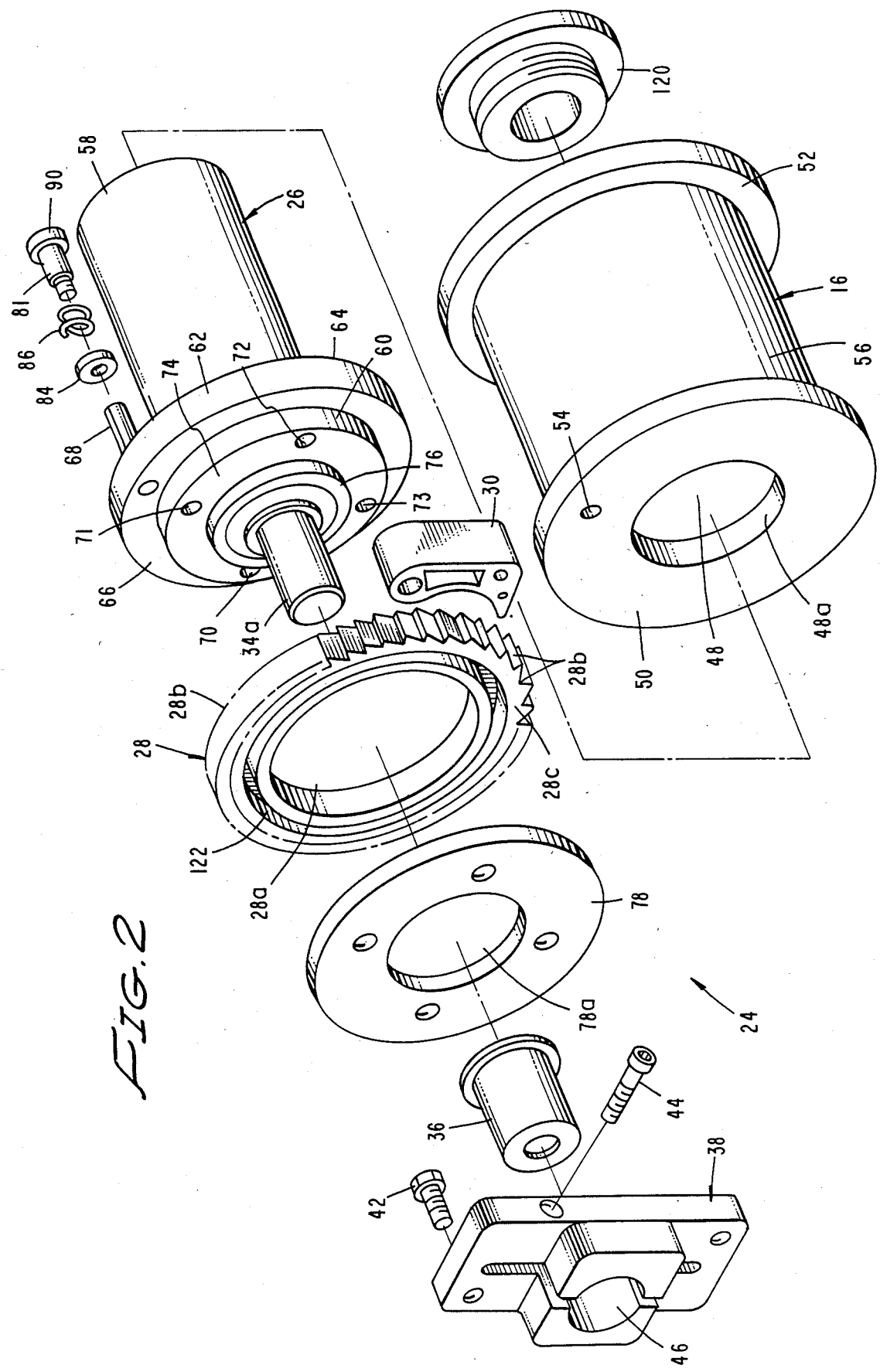
FIG. 2 is an exploded perspective view of the brake system of this invention.

As best shown in FIG. 2, the braking system 24 of this invention includes a spindle 26, an annular brake member 28, and a pawl 30 which is under the control of a solenoid 32 (FIG. 4). The brake member 28, which has a large central opening 28a, is carried on the spindle 26 and allows the spindle to slip relative to the brake member when the pawl 30 engages one tooth of a series of teeth 28b in the circumference of the brake member to bring the brake member to an abrupt halt.

Figure 3:
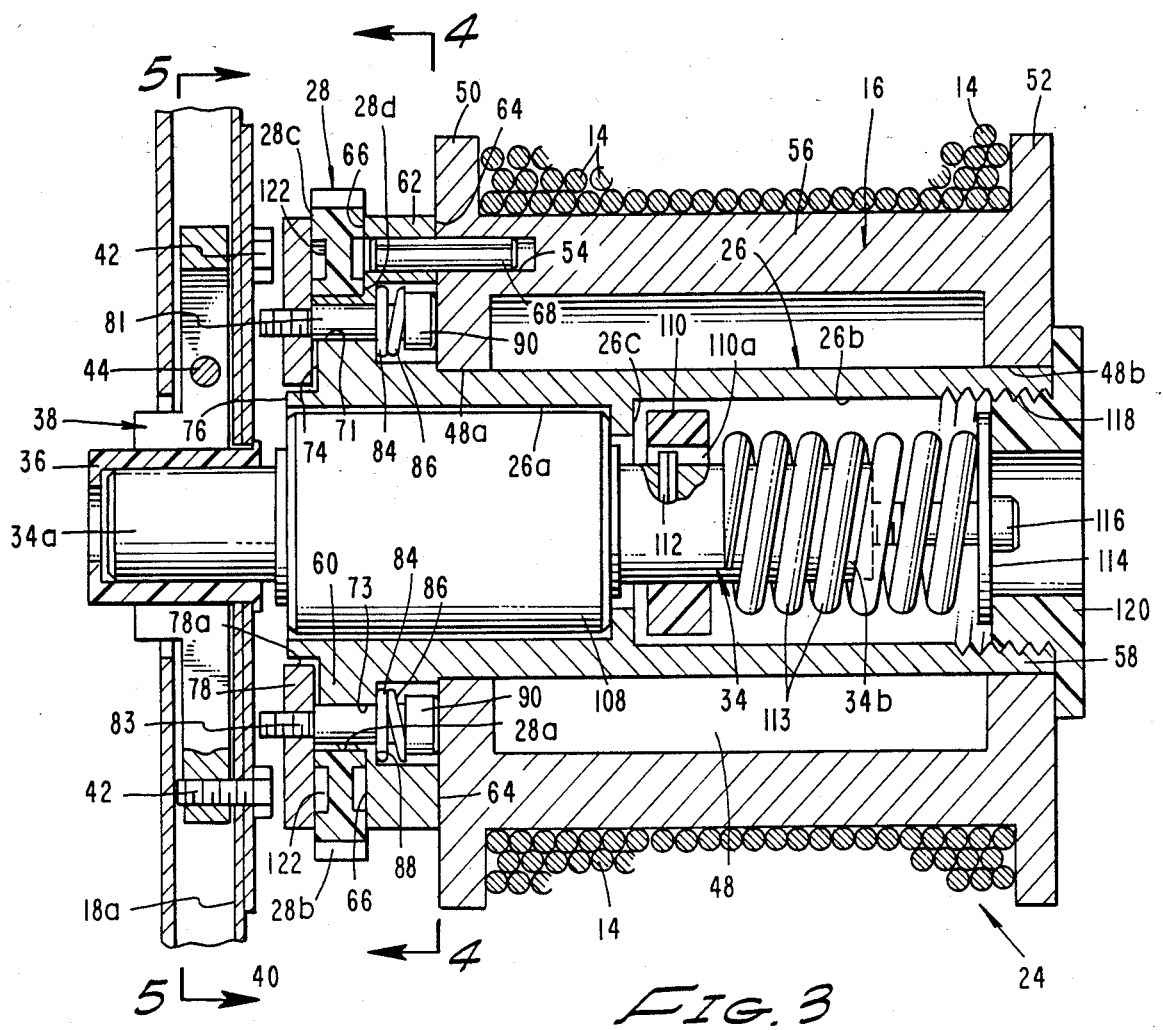
FIG. 3 is a cross-sectional view taken along line 3—3 of FIG. 1.

As best shown in FIG. 3, the spindle 26 is a cylindrical member having a stationary shaft 34 with one end 34a received within an insulated shoulder bushing 36 carried in a clamp plate 38. A steel washer 40 (FIG. 3) on one side of the rear wall 18a of the unit 18 is held by clamp screws 42 which pass through the wall and into the clamp plate 38. The insulated bushing 36 electrically isolates the spindle 26 from the machine 10 and is a desirable safety feature. With the end 34a of the shaft 34 seated in the bushing 36, a set screw 44 is tightened to constrict the opening 46 in the clamp plate 38 to hold the shaft 34 securely and prevent it from rotating.

As best shown in FIG. 2, the outer end 58 of the spindle 26 has a diameter which is slightly less than the diameter of the opening 48a to the passageway 48 of the spool 16 to allow the spool to be fitted over this outer end 58 and be carried by the spindle. The inner end 60 of the spindle 26 has a raised flange member 62 having an outer annular face 64 and an inner annular face 66. The distance between the outer face 64 and the outer end 58 of the spindle 26 is approximately equal to the width of the spool 16. Extending outwardly from the outer face 64 is a spring pin 68 which is received in the receptacle 54 in the spool 16 when the spool is placed on the spindle 26. This spring pin 68 couples the spool 16 and spindle 26 together so that they rotate in unison as the wire filler material 14 is pulled from the spool.

There are four countersunk bores 70, 71, 72, and 73 extending through the outer face 64 of the flange member 62 and out a raised annular section 74 of the flange member. A reduced diameter section 76 of the spindle 26 is immediately adjacent the raised annular section 74. The brake member 28 is seated on the spindle 26, with the diameter of the annular section 74 being approximately equal to the diameter of the opening 28a in the brake member. An annular backup plate 78, which has an opening 78a with a diameter slightly larger than the diameter of the reduced diameter section 76, is placed in position on the spindle 26, sandwiching the brake member 28 between the flange member 62 and the backup plate. The face 66 acts as a braking surface bearing on the face 28d of the brake member 28. Four spring loaded bolts 80, 81, 82, and 83 (FIG. 4) with flat washers 84 and compression springs 86 are screwed into the backup plate 78 to hold the brake member 28 firmly in position between the backup plate 78 and the flange member 62. The springs 86 bear against the washers 84 seated in the bottoms 88 of the countersunk bores 70–73 and exert a force between the heads 90 of the bolts 80–83 and these bottoms. This force pulls the backup plate 78 towards the brake member 28, squeezing the brake member between the backup plate and the flange member 62. A series of stacked together Belleville washers could be used instead of the springs 86.

As shown in FIG. 4, the pawl 30 is pivotally mounted at its one end 92 to the unit 18. A generally L-shaped link 94 has one arm 94a connected at end 96 by a pin 97 which is restrained by a cotter pin 98 to the actuator 100 of the solenoid 32 and at its other end 102 to the hook end 30a of the pawl 30. The other arm 94b of the link 94 has a finger loop 104 in it that permits one to manually pull the hook end 30a of the pawl 30 outwardly from the teeth 28b of the brake member 28. An extension spring 106 connected between the unit 18 and the link 94 provides the return force for the pawl 30 when the solenoid 32 is deenergized.

As best shown in FIG. 3, the spindle 26 is mounted to rotate freely on the shaft 34 by a bearing 108. The central section of the spindle 26 is hollow and has two chambers 26a and 26b. The inner chamber 26a houses the bearing 108. The outer chamber 26b receives a drag device 111 including a friction washer 110 made of plastic which is restrained from rotating by a spring pin 112 that is inserted into the shaft 34. The washer 110 has a lateral slot 110a in it that receives the spring pin 112, with the washer moving laterally along the shaft 34 and the pin riding in the slot. A coiled spring 113 is seated on the end 34b of the shaft 34, and a screw 116 is screwed into this end to bring a washer 114 into engagement with the end of the coiled spring, forcing the spring to press inwardly against the washer which presses against the inside wall 26c of the chamber 26b. The frictional forces generated by the washer 114 bearing against the wall 26c create the necessary drag force to prevent the wire filler material 14 from unspooling due to the inherent spring action in the coiled material 14.

The inside end 118 of the chamber 26b is threaded and receives a threaded end cap 120. The spool 16 is mounted on the spindle 26 by removing the end cap 120 and inserting the spindle into the passageway 48 through the open end 48a, with the outer face 64 of the flange member 62 serving as a stop to limit the inward movement of the spool. The end cap 120 is then screwed into position, bearing against the face plate 52 of the spool 16 to hold the spool in position.

OPERATION AND DESIGN CONSIDERATIONS

In operation, the spool 16 is carried on the spindle 26 with the wire filler material 14 being pulled from the spool in response to the operator depressing the control switch 22. When feed of the wire material 14 is stopped by the operator releasing the control switch 22, the drive motors immediately discontinue feeding material. The momentum of the spool 16 causes the spool and spindle 26 assembly to continue to rotate until the pawl 30 engages one of the teeth 28b of the brake member 28. This will occur immediately upon release of the control switch 22, which energizes the solenoid 32 to cause the pawl 30 to pivot, with the hook end 30a engaging one of the teeth 28b of the brake member 28. When this occurs, rotation of the brake member 28 stops immediately. The braking surface, face 66, of the flange member 62 now slides across the braking surface, face 28d, of the brake member 28 to dissipate the kinetic energy of the spool as heat due to the frictional forces between the two braking surfaces. The angular rotation of the spindle will be limited so that it does not exceed twenty degrees. This is controlled by proper design of the braking system 24, and selection of materials, and upon the size and weight of the spool 16 of wire filler material 14 being carried by the spindle 26. In accordance with this invention, the desired degree of rotation of the spindle 26 is maintained without periodic adjustment. This is achieved by utilizing the spring loaded bolts 80–83 to provide the desired force over the range of displacements resulting from the dimensional tolerances encountered. It is estimated that field wear of the braking surfaces will be about 0.005 inch over the useful life of the braking system 24. This would result in approximately plus or minus 2.8 pounds in change in the force originally exerted between the surfaces. This original force is about forty-five pounds per bolt (80–83).

The frictional force acting between these faces 66 and 28d is set by the spring loaded bolts 80–83 to be sufficient to allow slippage which does not exceed twenty degrees of rotation with a fully loaded spool 16. As friction wears away some of the face 28d, the spring will continue to exert force. A variation in force due to this wear and the tolerances of the springs 86 and bolts 80–83 will occur, but this variation will be minimal. This results in the length of the spring 86 changing slightly over the useful life of the braking system 24. Since this change is relatively small compared to the total length of the spring 86, the change in force per unit area acting between the faces 28d and 66 will be within the design limits and the spool 16 will not rotate more than twenty degrees after the pawl 30 stops rotation of the brake member 28.

The braking system 24 of this invention provides for a plus or minus fifteen percent change in the force applied between the braking surfaces due to component tolerance and allows for field wear change of approximately six percent without any adjustment. The spool 16 may be rotated backwards with no adverse effect, since the pawl 30 ratchets over the teeth. This is a desirable feature of this invention which allows wire filler material 14 to be rewound onto the spool 16 without adverse consequences. Forcing the spool 16 forward without releasing the pawl 30 does not in any way damage the braking system 24 although it may be somewhat difficult to accomplish.

The braking system 24 comprises a very few easily molded or machined parts and may be assembled easily with no adjustment. It should be noted that the area of the brake face 28d has no effect on the resulting stopping force. The only factors are the coefficient of friction of materials, the normal force provided by the springs, and the moment arm through which the force acts. As a result, it is desirable to reduce material costs by providing an undercut 122 in the brake member 28 from both sides. This reduces the amount of material and the molding cycle time by providing a more uniform cross-section for cooling. Brake disc wear is increased due to the reduction in area and corresponding increase in force per unit area results. However, it is still negligible over the life of the braking assembly. The sliding braking surfaces are always in intimate contact with each other. This precludes contamination by dirt, dust and moisture which could degrade stopping performance and increase wear rates. The preferred material for brake member 28 is a polymer such as, for example, Delrin made by DuPont Corporation. Preferably, the pawl 30 and end cap 120 are also made of polymeric material such as, for example, Delrin made by DuPont Corporation. Using the polymeric material reduces costs.

SCOPE OF THE INVENTION

The above description presents the best mode contemplated for carrying out the present invention as depicted by the preferred embodiment disclosed. The combination of features illustrated in this embodiment provides for its low cost of manufacture, the ability to dissipate the kinetic energy of the spool, and to maintain its excellent performance characteristics without field adjustments. This invention is, however, susceptible to modifications and alternate constructions from the embodiment shown in the drawing and described above. Consequently, it is not the intention to limit it to the particular embodiment disclosed. On the contrary, the intention is to cover all modifications and alternate constructions falling within the scope of the invention as generally expressed by the following claims.

I claim:

1. In a welding machine which feeds filler material in the form of wire on a spool to a welding gun,
    a spindle mounted to the machine to rotate, said spindle having a braking surface and outer end which fits into the spool when the spool is placed on the spindle,
    a means for detachably coupling together the spindle and the spool when the spool is placed on the spindle so that said spindle and spool rotate together as a unit as wire is pulled from the spool, and
    braking means for stopping rotation of the spindle and spool, including
        a brake member having a braking surface which bears against the spindle braking surface and frictionally couples the braking member to the spindle so that the brake member and spindle rotate together as a unit as wire is pulled from the spool,
        said spindle braking surface sliding over the brake member braking surface through a predetermined rotational distance when the rotation of the brake member is stopped abruptly, and
        means for selectively and abruptly stopping the rotation of the brake member.

2. In the welding machine of claim 1,
    self adjusting means for maintaining the frictional force between the brake member braking surface and spindle braking surface within a predetermined range so that said predetermined rotational distance is not exceeded with repeated use of the braking means.

3. In the welding machine of claim 2 wherein said predetermined rotational distance does not exceed about twenty degrees of rotation.

4. In the welding machine of claim 1,
    means for creating a frictional drag on the spindle so that the wire does not unspool.

5. In a welding machine which feeds filler material in the form of wire on a spool to a welding gun,
    a spindle, having an outer end and an inner end, which is mounted to the machine so that the spindle is free to rotate in either a clockwise or counterclockwise direction,
    said spindle having at the inner end a raised flange member having first and second opposed faces, the first face serving as a braking surface and the second face serving as a stop for limiting the movement of the spool as the spool is placed on the spindle, with the outer end of the spindle fitting into the spool, and means extending outwardly from the second face which engages the spool as said spool is placed on the spindle to detachably couple the spindle and spool together so that said spindle and spool rotate as a unit as wire is pulled from the spool, and braking means for stopping rotation of the spindle and spool, including an annular brake member mounted to the spindle at the inner end, said brake member having along its circumference a series of teeth and a face which serves as a braking surface, said brake member face bearing against the first face of the flange member internal wall forming a cavity within the spindle that terminates in an opening at the outer end to provide access to said cavity, said spindle being mounted to the machine by means which enable the spindle to freely rotate in either a clockwise or counterclockwise direction, and having at the inner end a raised flange member having first and second faces, said first face serving as a braking surface and said second face serving as a stop for limiting the movement of the spool as the spool is placed on the spindle by inserting the outer end of the spindle into the passageway in the spool, pin means which is slidably received in the receptacle of the spool as said spool is placed on the spindle to detachably couple the spindle and spool together to enable said spindle and spool to rotate as a unit as wire is pulled from the spool, means received within the cavity in the spindle for creating frictional drag on the spindle so that the wire does not unspool, means removably connected to the outer end of the spindle for holding the spool on the spindle, and braking means for stopping the rotation of the spindle and spool, including an annular brake member coaxially mounted to the spindle at the inner end, said brake member having along its circumference a series of teeth and first and second opposed faces, said first face of the brake member bearing against the first face of the flange member, and frictionally coupling the brake member to the spindle so that the brake member and spindle rotate together as a unit as wire is pulled from the spool, said brake member face and first face of the flange member sliding relative to each other through a predetermined rotational distance when the rotation of the brake member is stopped, and means for selectively stopping the rotation of the brake member, including a pawl element which engages one of the teeth of the brake member to stop rotation of said brake member.

6. In the welding machine of claim 5, self adjusting means for maintaining the frictional force between the brake member braking surface and spindle braking surface within a predetermined range so that said predetermined rotational distance is not exceeded with repeated use of the braking means.

7. The welding machine of claim 6 wherein said predetermined rotational distance does not exceed about twenty degrees.

8. In the welding machine of claim 7, means for creating a frictional drag on the spindle so that the wire does not unspool.

9. In a welding machine which feeds to a welding gun material in the form of wire coiled on a spool which has an elongated passageway extending therethrough and a receptacle at an end thereof, a spindle having an inner end, an outer end, and an internal wall forming a cavity within the spindle that terminates in an opening at the outer end to provide access to said cavity, said spindle being mounted to the machine by means which enable the spindle to freely rotate in either a clockwise or counterclockwise direction, and having at the inner end a raised flange member having first and second faces, said first face serving as a braking surface and said second face serving as a stop for limiting the movement of the spool as the spool is placed on the spindle by inserting the outer end of the spindle into the passageway in the spool, pin means which is slidably received in the receptacle of the spool as said spool is placed on the spindle to detachably couple the spindle and spool together to enable said spindle and spool to rotate as a unit as wire is pulled from the spool, means received within the cavity in the spindle for creating frictional drag on the spindle so that the wire does not unspool, means removably connected to the outer end of the spindle for holding the spool on the spindle, and braking means for stopping the rotation of the spindle and spool, including an annular brake member coaxially mounted to the spindle at the inner end, said brake member having along its circumference a series of teeth and first and second opposed faces, said first face of the brake member bearing against the first face of the flange member, an annular plate coaxially mounted to the spindle at the inner end, said annular plate having a bearing face, with the brake member disposed between said plate and the flange member and the second face of the brake member bearing against the bearing face of said plate, said flange member and brake member, being frictionally coupled together so that they rotate together as a unit as wire is pulled from the spool, said first face of the flange member sliding over the first face of the brake member through a predetermined rotational distance which does not exceed about twenty degrees of rotation when the rotation of the brake member is stopped abruptly, means for maintaining the frictional force between the faces of the brake member and the flange member within a predetermined range so that said predetermined rotational distance is not exceeded with repeated use of the braking means, including a plurality of spring loaded fasteners which connect the flange member to the plate, and means for selectively stopping the rotation of the brake member, including a pawl element which engages one of the teeth of the brake member to stop rotation of said brake member abruptly.

10. In the welding machine of claim 9, said means for creating frictional drag on the spindle including spring loaded means which bear against the internal wall of the cavity, and means for adjusting the spring load on said spring loaded means.

11. In the welding machine of claim 9 wherein the spindle is mounted by bearing means on a stationary shaft having one end seated in an insulator which electrically isolates the spindle from the welding machine.

12. In the welding machine of claim 9 wherein the brake member is made of a rigid polymeric material that has a coefficient of friction which facilitates sliding movement between said faces.

* * * * *